April 20, 1926.

R. I. RATNER

TABLE GLASSWARE

Filed July 18, 1924

1,581,691

INVENTOR
BY
ATTORNEY

Patented Apr. 20, 1926.

1,581,691

UNITED STATES PATENT OFFICE.

RICHARD I. RATNER, OF NEW YORK, N. Y., ASSIGNOR TO LIBBEY GLASS MANUFACTURING CO., OF TOLEDO, OHIO, A CORPORATION OF OHIO.

TABLE GLASSWARE.

Application filed July 18, 1924. Serial No. 726,878.

*To all whom it may concern:*

Be it known that I, RICHARD I. RATNER, a citizen of the United States, and a resident of New York, county and State of New York, have invented certain new and useful Improvements in Table Glassware, of which the following is a specification.

The object of the present invention is to provide a table glass which shall possess unusual strength and resistance to chipping, particularly at the rim of the glass.

The invention will be understood by reference to the accompanying drawings in which—

Figure 1:
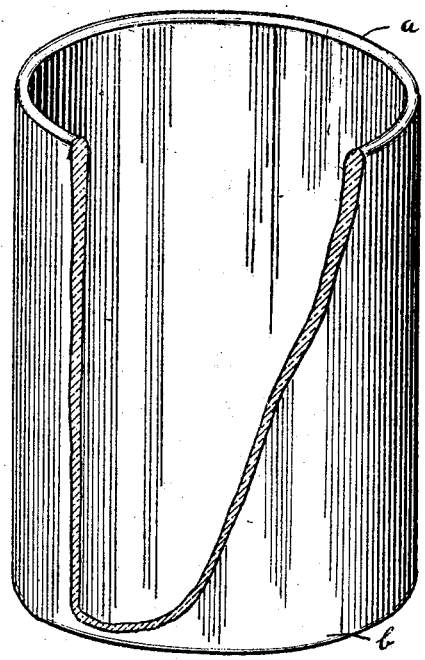
Figure 2:
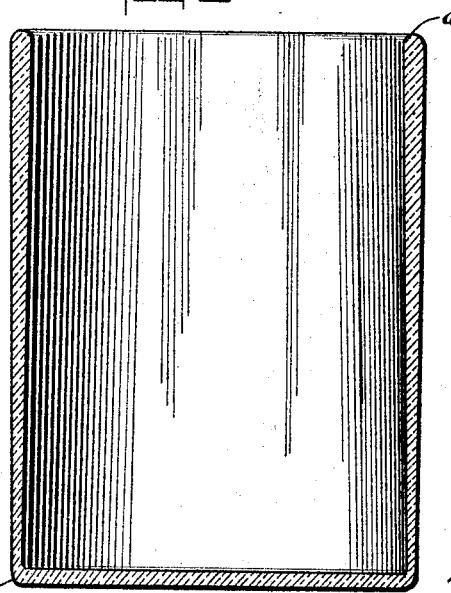

Figure 1 is an elevation of a table glass formed in accordance with the present invention, the glass being partly broken away, and Figure 2 is a vertical sectional elevation of the same.

It is known that the most vulnerable part of a table glass is at and near its rim. By the present invention I provide a glass of increased or double thickness at the top or rim $a$, the glass being of gradually decreasing thickness either to the base $b$ or to some point above the base, as desired.

By reference to the drawings it will be seen that the rim $a$ is rounded so that the extreme top will not come into contact with surfaces upon falling of the glass or when two glasses are picked up together and thus the shock of contact is placed at a point below the extreme top or where the glass is the thickest and strongest so that the rim will have resistance to chipping or cracking.

The glass may be produced by pressing or blowing. In the latter case glass may be added to the side wall, and the top may be smoothly melted or ground until it assumes the form illustrated in the drawing.

As stated above, the heavy thickness of the glass may range at any desired point above the base B, and various modifications may be made in the form of glass illustrated in the drawings without departing from the spirit of the invention.

What I claim and desire to secure by Letters Patent being as follows:—

In table glassware, a glass having its greatest thickness immediately below its rim, the said rim being rounded so that the extreme top of the rim will not come into contact with a plane surface meeting the side wall of the glass, the glass being of gradually decreasing thickness toward its base.

In testimony whereof, I have signed my name to this specification.

RICHARD I. RATNER.